United States Patent
Maruyama et al.

(10) Patent No.: US 10,059,203 B2
(45) Date of Patent: Aug. 28, 2018

(54) ACCELERATOR PEDAL REACTION FORCE CONTROL DEVICE

(71) Applicant: HONDA MOTOR CO., LTD., Minato-Ku, Tokyo (JP)

(72) Inventors: Kohei Maruyama, Utsunomiya (JP); Hideto Nebuya, Utsunomiya (JP); Naoto Sen, Utsunomiya (JP); Takayuki Yoshimura, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 268 days.

(21) Appl. No.: 14/912,962

(22) PCT Filed: Aug. 8, 2014

(86) PCT No.: PCT/JP2014/070975
§ 371 (c)(1),
(2) Date: Feb. 19, 2016

(87) PCT Pub. No.: WO2015/025736
PCT Pub. Date: Feb. 26, 2015

(65) Prior Publication Data
US 2016/0200194 A1    Jul. 14, 2016

(30) Foreign Application Priority Data
Aug. 22, 2013 (JP) ................. 2013-171833

(51) Int. Cl.
*B60K 26/02* (2006.01)
*F02D 11/10* (2006.01)

(52) U.S. Cl.
CPC ...... *B60K 26/021* (2013.01); *B60K 2026/022* (2013.01); *F02D 11/106* (2013.01)

(58) Field of Classification Search
CPC ............ B60K 26/021; B60K 2026/022; F02D 11/106
See application file for complete search history.

(56) References Cited

U.S. PATENT DOCUMENTS

| 8,751,126 B2 | 6/2014 | Sakaguchi et al. |
| 9,464,578 B2 | 10/2016 | Shiomi et al. |

(Continued)

FOREIGN PATENT DOCUMENTS

| CN | 102084106 A | 6/2011 |
| CN | 102470755 A | 5/2012 |

(Continued)

OTHER PUBLICATIONS

Extended European search report (ESSR) dated Mar. 2, 2017 issued over the corresponding EP Patent Application 14838133.8.

(Continued)

*Primary Examiner* — Thomas P Ingram
(74) *Attorney, Agent, or Firm* — Carrier Blackman & Associates, P.C.; Joseph P. Carrier; Fulchand P. Shende

(57) ABSTRACT

An acceleration pedal reaction force control device imparts to a driver a sensation (feeling) of an appropriate reaction force in accordance for example with an intention of/operation performed by the driver. The acceleration pedal reaction force control device is configured such that when a stepping amount on the acceleration pedal has become equal to or exceeded a threshold stepping amount, whether a reaction force increase rate at which a base reaction force increases to a target reaction force with the threshold stepping amount should be made variable or a reaction force increase amount (enhancing reaction force) for causing the base reaction force to increase to the target reaction force with the threshold stepping amount should be made variable can be set. Thereby, a sensation (feeling) of an appropriate reaction force can be imparted to a driver in accordance for example with an intention of/an operation performed by the driver.

5 Claims, 6 Drawing Sheets

(56) References Cited

U.S. PATENT DOCUMENTS

| | | | | |
|---|---|---|---|---|
| 2012/0059563 A1* | 3/2012 | Sakaguchi | ........... | B60K 26/021 |
| | | | | 701/70 |
| 2014/0109717 A1* | 4/2014 | Maruyama | ........... | B60K 26/021 |
| | | | | 74/513 |
| 2014/0116379 A1* | 5/2014 | Maruyama | ........... | B60K 26/021 |
| | | | | 123/349 |

FOREIGN PATENT DOCUMENTS

| | | |
|---|---|---|
| JP | 2007-076468 A | 3/2007 |
| WO | 2012/176442 A1 | 12/2012 |
| WO | 2013/005374 A1 | 1/2013 |

OTHER PUBLICATIONS

Office Action with Search Report dated Jul. 25, 2017 issued in the corresponding Chinese patent application No. 201480045646.X with the English translation of the Office Action and partial translation of the Search Report.

* cited by examiner

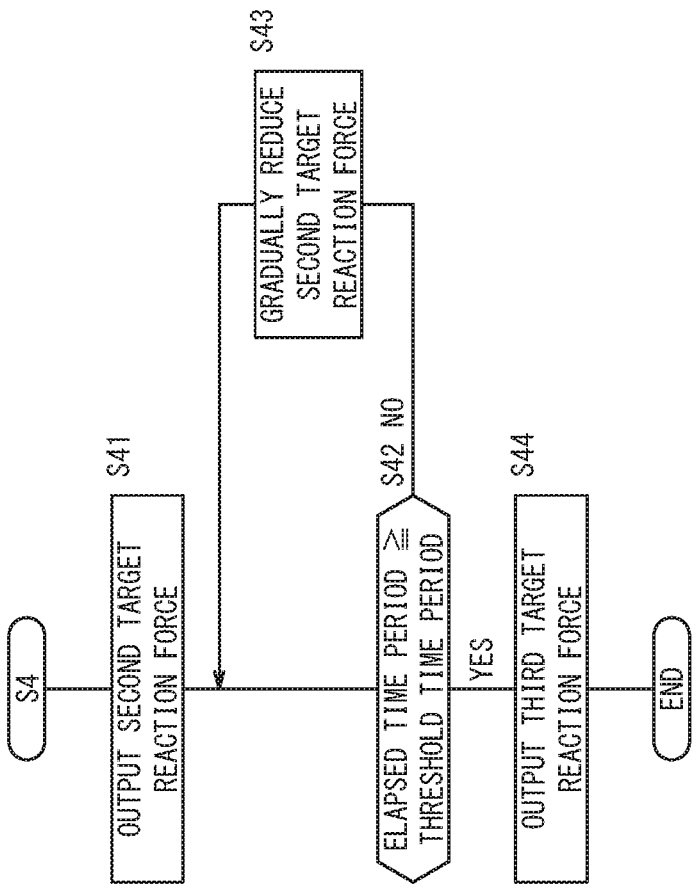
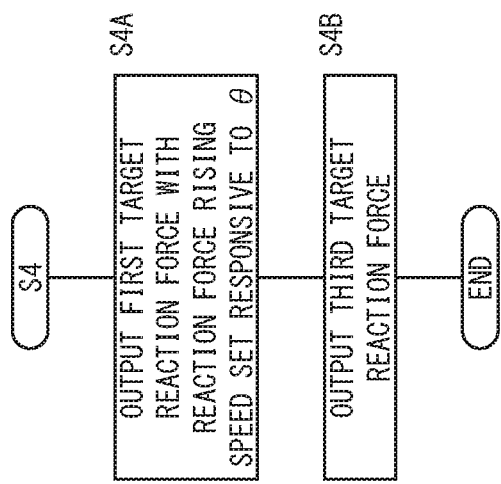

ACCELERATOR PEDAL REACTION FORCE CONTROL DEVICE

TECHNICAL FIELD

The present invention relates to an accelerator pedal reaction force control device that controls a reaction force in an opposite direction to a depressing direction of an accelerator pedal provided in a vehicle.

BACKGROUND ART

International Publication No. WO 2013/005374 (hereinafter referred to as "WO2013/005374A") discloses a technique in an accelerator pedal reaction force control device for variably controlling a reaction force of the accelerator pedal, by which a depression reaction force is increased by a reaction force control unit when a depression amount of the accelerator pedal exceeds a predetermined depression amount (see paragraphs [0056], [0057], and FIGS. 10 and 11 of WO2013/005374A).

As a technology for increasing a depression reaction force at a predetermined depression amount of an accelerator pedal, a DBW (Drive by Wire) technology, which is capable of setting a predetermined depression reaction force at a predetermined depression amount by a reaction force control unit, or the like has been adopted (see paragraph [0035] of WO2013/005374A).

SUMMARY OF INVENTION

Incidentally, in accordance with the reaction force control unit, in the case that a reaction force in a direction opposite to the direction in which the accelerator pedal is depressed is increased, depending on the manner in which the reaction force is increased, it has been discovered that the perception (feeling) given to the driver is different.

The present invention has been devised taking into consideration the aforementioned technology as well as the aforementioned knowledge, and has the object of providing an accelerator pedal reaction force control device, which is capable of devising a way of increasing the reaction force responsive to the intention and operations or the like of the driver which operates the accelerator pedal, and giving, to the driver, a perception (feeling) of an appropriate reaction force responsive to the intention and operations or the like of the driver.

An accelerator pedal reaction force control device according to the present invention controls a reaction force in an opposite direction to a depressing direction of an accelerator pedal provided in a vehicle. The accelerator pedal reaction force control device includes a depression amount detector configured to detect a depression amount of the accelerator pedal, a reaction force imparting unit configured to impart the reaction force to the accelerator pedal, and a reaction force control unit configured to control a manner in which the reaction force is increased by the reaction force imparting unit. The reaction force control unit, in the event that the depression amount detected by the depression amount detector becomes greater than or equal to a threshold value, sets a target reaction force imparted by the reaction force imparting unit, and sets whether a reaction force rising speed at which the reaction force increases from a base reaction force at the threshold value to the target reaction force should be made variable, or a reaction force increase amount by which the reaction force increases from the base reaction force at the threshold value to the target reaction force should be made variable.

According to the manner in which the reaction force is increased (manner of rising) when the reaction force is imparted to the accelerator pedal, the way in which the reaction force is felt or perceived by the driver differs. Further, the feeling or perception thereof also differs depending on the preferences, etc., of the driver.

Focusing on such knowledge, by providing a configuration in which it is possible to set whether the reaction force rising speed at which the reaction force increases from a base reaction force at a given threshold value to a target reaction force, should be made variable, or a reaction force increase amount by which the reaction force is made to increase from the base reaction force at the threshold value to the target reaction force, should be made variable, an appropriate perception (feeling) of the reaction force can be offered, which is responsive to the intention and operations, etc. of the driver. Therefore, for example, the manner of operation (driving style) of the accelerator pedal can be selected which is suitable for the traffic situation and the mood of the driver or the like.

In this case, if a configuration is provided in which, in the reaction force control unit, the target reaction force in the case that the reaction force rising speed is set to be variable is defined as a first target reaction force, the target reaction force in the case that the reaction force increase amount is set to be variable is defined as a second target reaction force, and the second target reaction force is set to be greater than the first target reaction force, then in the case that the reaction force rising speed is set to be variable, compared to the case of setting the reaction force increase amount to be variable, it is possible for the reaction force at the threshold value to rise slowly to the first target reaction force of a small value, and therefore, imparting a sense of discomfort to the driver due to the increase in the reaction force is suppressed. On the other hand, in the case that the reaction force increase amount is set to be variable, then since rising of the reaction force at the threshold value up to the second target reaction force of a large value can be enabled, it can be emphasized that the reaction force has increased, and the driver can easily be made to notice the increase in the reaction force.

In the reaction force control unit, if the depression amount detected by the depression amount detector has become equal to the threshold value, the reaction force is set to increase stepwise to the second target reaction force, and after a predetermined time period following the increase thereof has elapsed, is set to decrease to a third target reaction force that is smaller than the second target reaction force. In this case, at a point in time that the accelerator pedal is depressed to the threshold value, in accordance with the second target reaction force, which is applied in a stepwise manner, it is possible to notify the driver of the occurrence of the reaction force, and thereafter, by gradually decreasing to the third target reaction force, it is possible to prevent maintenance of a situation in which it is difficult to depress the accelerator pedal. By carrying out such a control, it is possible to achieve a good balance between ease of operation of the accelerator pedal and ease of noticing that the reaction force has been generated.

A configuration may be provided in which, in the reaction force control unit, after elapse of the predetermined time period, when the reaction force is set to decrease to the third target reaction force that is smaller than the second target reaction force, the reaction force may be set so as to decrease rapidly to a predetermined reaction force, which is greater than the third target reaction force, and thereafter, may be set to decrease gradually to the third target reaction force. In accordance with this configuration, by rapidly decreasing the reaction force to the predetermined reaction force, a large reaction force is prevented from being maintained for a long time, and a situation in which it is difficult for the accelerator pedal to be depressed by the driver is eliminated. Together therewith, by gradually decreasing the reaction force after having been decreased to the predetermined reaction force, a sense of discomfort due to so-called sudden falling off of the reaction force can be reduced.

The third target reaction force may be of the same value as the first target reaction force.

A configuration may be provided in which, in the reaction force control unit, after elapse of the predetermined time period, when the reaction force is set to decrease to the third target reaction force that is smaller than the second target reaction force, the reaction force is set so as to decrease exponentially with the passage of time. In this case, the reaction force decreases rapidly upon starting to decrease, and thereafter decreases more gradually. Therefore, it is possible to both quickly eliminate a condition in which depression of the accelerator pedal is difficult, and reduce a sense of discomfort due to sudden falling off of the reaction force.

Furthermore, a configuration may be provided in which a selecting unit is included, which selects whether the reaction force rising speed should be made variable, or the reaction force increase amount should be made variable, and the reaction force control unit may carry out either one of the settings responsive to a selection result of the selecting unit. Due to this configuration, since, by the driver or the like operating the selecting unit, it is possible to select whether the reaction force rising speed or the reaction force increase amount should be made variable, the perception (feeling) of the reaction force of the accelerator pedal can be selected in accordance with the driver's intention.

For example, when it is intended to drive with low energy consumption, i.e., low fuel or electricity consumption, with the intention of so-called eco-driving (low energy consumption driving), a control in which the reaction force increase amount is made variable may be selected through the selecting unit, wherein the second target reaction force having a relatively large reaction force is set. In contrast thereto, when entering from a general road into a high-speed expressway, since the intention and operations of the driver to accelerate are given priority, it is possible to select a control in which the reaction force rising speed is made variable, wherein the first target reaction force having a relatively small reaction force is set.

In the accelerator pedal reaction force control device according to the present invention, a configuration is provided in which it is possible to set whether a reaction force rising speed, at which the reaction force increases from a base reaction force at a given threshold value to a target reaction force, should be made variable, or a reaction force increase amount, by which the reaction force is made to increase from the base reaction force at the threshold value to the target reaction force, should be made variable, when the depression amount of the accelerator pedal becomes greater than or equal to the threshold value. Therefore, an effect is achieved in that an appropriate perception (feeling) of the reaction force can be given, which is responsive to the intention and operations or the like of the driver.

Therefore, for example, a secondary effect is achieved, in which the manner of operation (driving style) of the accelerator pedal can be selected, which is suitable for the traffic situation and the mood of the driver or the like.

BRIEF DESCRIPTION OF DRAWINGS

FIG. 3A is a flowchart of a process of outputting a target reaction force at a certain rate of rise of the reaction force that is set responsive to a depression amount;

FIG. 3B is a flowchart of a process for gradually decreasing the output, after having enhanced and output a target reaction force that is greater than the above-mentioned target reaction force;

DESCRIPTION OF EMBODIMENTS

Below, an embodiment of the present invention will be described with reference to the accompanying drawings.

Figure 1:
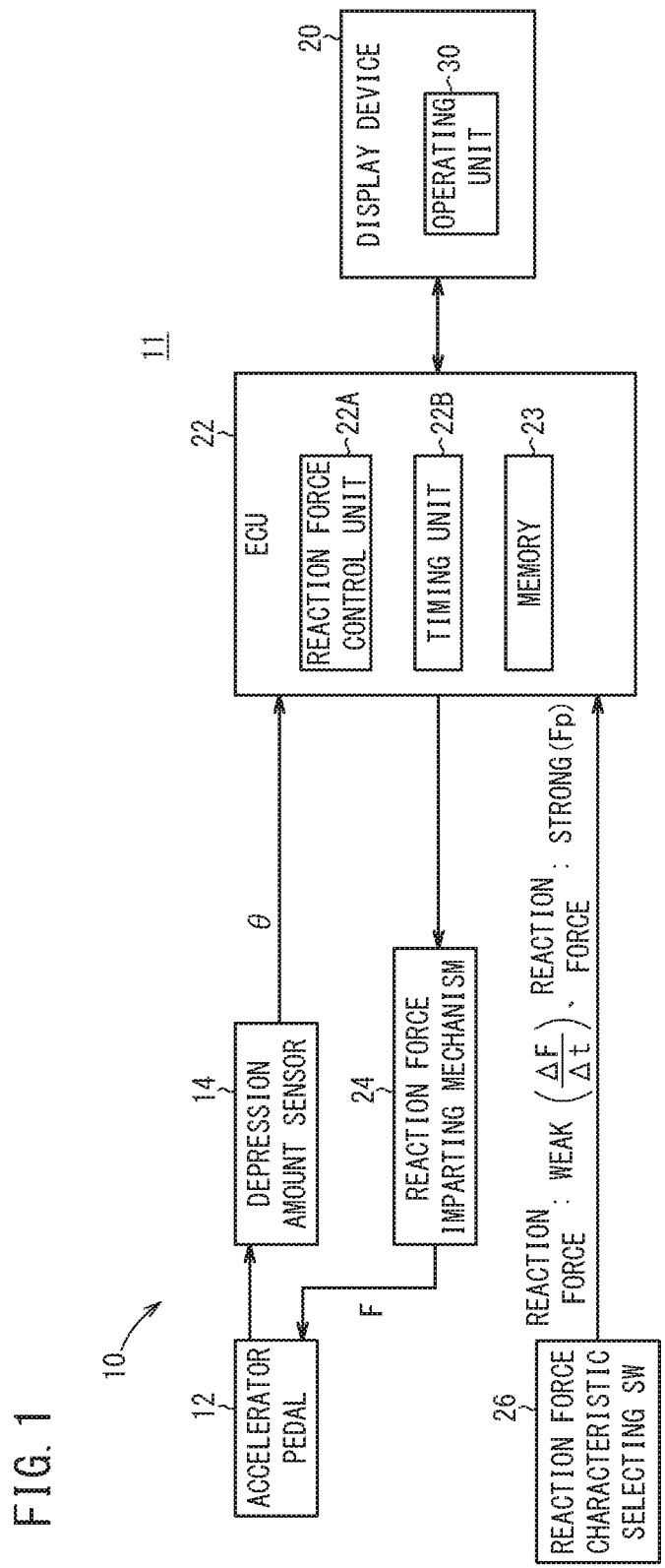
FIG. 1 is a block diagram of an accelerator pedal reaction force control device according to an embodiment of the present invention.

FIG. 1 is a block diagram of an accelerator pedal reaction force control device 10 according to an embodiment of the present invention.

The accelerator pedal reaction force control device 10 is mounted in a vehicle 11 such as a four-wheel vehicle or the like, and basically is equipped with an accelerator pedal 12 that adjusts a degree of opening of a throttle valve (not shown), a depression amount sensor 14 as a depression amount detector that detects a depression amount θ [°], which is an operating amount of the accelerator pedal 12 by the driver, a display device 20, an ECU (electronic control unit) 22, a reaction force imparting mechanism 24 as a reaction force imparting unit for imparting a reaction force F to the accelerator pedal 12, and a reaction force characteristic selecting switch (reaction force characteristic selecting SW) 26 as a reaction force characteristic selecting unit for selecting a reaction force characteristic (target reaction force characteristic), which is a manner of increasing the reaction force F that is imparted. The depression amount θ of the accelerator pedal 12 will be referred to as an accelerator pedal opening, and therefore, in order to facilitate understanding, the depression amount θ may also be referred to as an opening θ.

The vehicle 11 may be the subject of, in addition to an engine-driven automobile having an engine as a drive source, an electrical vehicle such as an EV (electric vehicle), a hybrid vehicle equipped with an engine, a range extender vehicle, and a fuel cell vehicle equipped with a fuel cell or the like.

The reaction force imparting mechanism 24 is constituted from an actuator such as a non-illustrated motor or the like that is connected to the accelerator pedal 12, and applies a reaction force F to the accelerator pedal 12 responsive to a control signal received from a reaction force control unit 22A. In the case that a return spring is provided on the accelerator pedal 12, the reaction force F is a composite reaction force made up from a reaction force from the return spring, and a reaction force from an actuator such as a motor or the like. The reaction force F imparted to the accelerator pedal 12 may be generated using only the actuator and without using a return spring.

The depression amount sensor 14 detects, by way of a potentiometer or the like, the depression amount (accelerator pedal depression amount) $\theta$ [°] relative to the original position ($\theta=0$ [°]) of the accelerator pedal 12, and outputs the same to the ECU 22.

According to the present embodiment, the display device 20 is a multi-information display, which is arranged on the dashboard so as to be capable of being observed by the driver, and which is capable of displaying in combination a travel distance, energy consumption (fuel consumption, electricity consumption, etc.), and the outside temperature, etc., and further comprises an operating unit 30 that can be operated through a touch screen. The display device 20 may be replaced with a navigation system.

The ECU 22 is constituted from a computer and a DSP, etc. By a CPU executing programs that are stored in a memory (storage device) 23 such as a ROM or the like based on various inputs thereto, the ECU 22 is operated as a function realizing unit (function realizing means) that implements various functions. In the present embodiment, the ECU 22 functions as the reaction force control unit 22A, a timing unit 22B including the function of a timer or the like, etc.

The reaction force characteristic selecting switch 26, as will be described later in detail in relation to reaction force characteristics at various selection positions, is a switch for selecting a target reaction force characteristic Ftc that is stored in the memory 23 to be superimposed on a base reaction force Fb (described later), in the case that the depression amount $\theta$ of the accelerator pedal 12 has become greater than or equal to a threshold depression amount (threshold opening) $\theta$th, or a target reaction force characteristic Ftc after adjustment thereof, in which the aforementioned target reaction force characteristic Ftc stored in the memory 23 is adjusted (modified).

Two basic target reaction force characteristics Ftc are stored in the memory 23. The reaction force characteristic selecting switch 26 is arranged at a position where the driver, even while driving the vehicle, can easily operate the switch with the fingers, for example, such as within the steering wheel or on the dashboard, etc.

In this case, in the vicinity of the position where the reaction force characteristic selecting switch 26 is arranged, for example, the phrase "Reaction Force: Weak" or "Low Force" is displayed at one of the selection positions for selecting a characteristic in which the target reaction force Ftar is relatively low, and the phrase "Reaction Force: Strong" or "High Force" is displayed at another one of the selection positions for selecting a characteristic in which the target reaction force Ftar is relatively high.

The accelerator pedal reaction force control device 10 according to the present embodiment is constructed and operates basically as described above. Next, the application, settings, and control process of the reaction force through the reaction force imparting mechanism 24 with respect to the accelerator pedal 12 by the (reaction force control unit 22A of the) ECU 22 will be described in greater detail with reference to the flowcharts of FIGS. 2, 3A, and 3B.

In step S1, the reaction force control unit 22A confirms the selection position of the reaction force characteristic selecting switch 26 in order to detect the intention and operations of the driver.

Since the reaction force characteristic selecting switch 26 includes a function to superimpose the target reaction force Ftar on the base reaction force Fb (described later) in the case that the depression amount $\theta$ of the accelerator pedal 12 has become greater than or equal to the threshold depression amount (threshold opening) $\theta$th, the reaction force characteristic selecting switch 26 serves as a switch that controls the user's operation of the accelerator pedal 12 (to apply a so-called wall feeling), whereby consumption of energy is reduced, and driving in a so-called eco-mode is applied. When it is desired to drive in a more economical mode, switching by the driver is performed to the selection position of the target reaction force Ftar "Reaction Force: Strong" (reaction force increase amount variable characteristic Fj), whereas when it is desired to drive in a moderate economical mode, switching by the driver is performed to the selection position of the target reaction force Ftar "Reaction Force: Weak" (reaction force rising speed variable characteristic Fi).

Next, in step S2, the manner of increasing (the slope, etc.) from the base reaction force Fb to the target reaction force Ftar is determined responsive to the (selected) selection position which has been detected.

Figure 4:
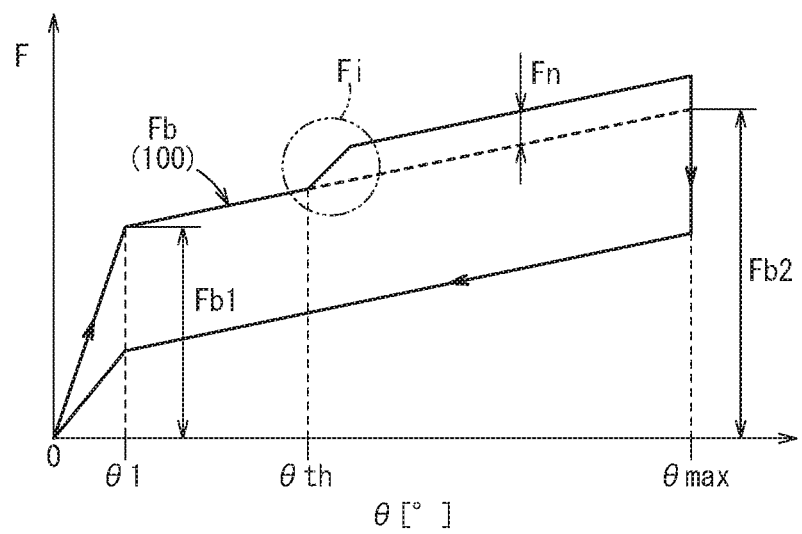
FIG. 4 is a characteristic diagram of a reaction force imparted with respect to the depression amount corresponding to the process of the flowchart of FIG. 3A.

In FIG. 4, a reaction force characteristic 101 is shown, which includes the reaction force rising speed variable characteristic Fi enclosed by a circle of two short dashes line, the characteristic Fi being selected from the target reaction force characteristics Ftc in response to the display position of the aforementioned "Reaction Force: Weak".

Figure 5:
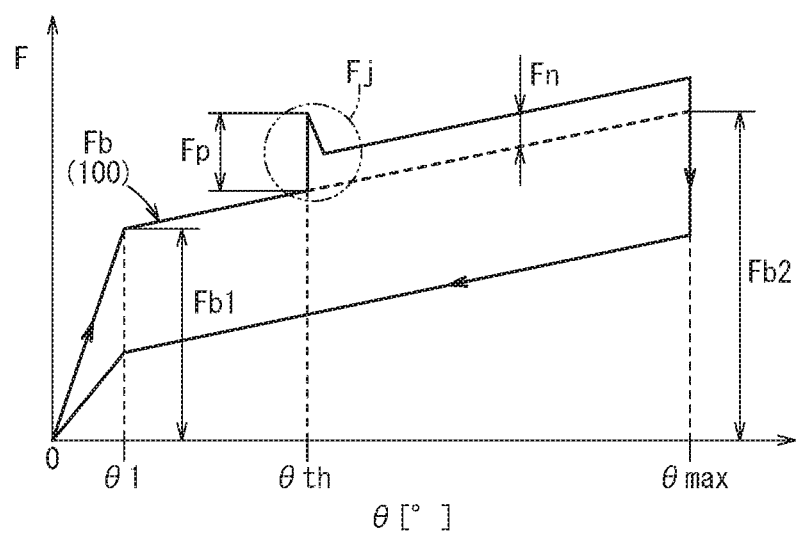
FIG. 5 is a characteristic diagram of a reaction force imparted with respect to the depression amount corresponding to the process of the flowchart of FIG. 3B.

In FIG. 5, a reaction force characteristic 102 is shown, which includes the reaction force increase amount variable characteristic Fj enclosed by a circle of two short dashes line, the characteristic Fj being selected from the target reaction force characteristics Ftc in response to the display position of the aforementioned "Reaction Force: Strong".

In the reaction force characteristics 101 and 102, a characteristic (referred to as a base reaction force characteristic 100) is formed in which, from the depression amount $\theta$ being $\theta=0$ [°] to a comparatively small depression amount $\theta1$, the base reaction force Fb increases comparatively steeply from an initial reaction force to a reaction force Fb1, and then increases more gradually to the reaction force Fb2 within a range of normal use, i.e., from the depression amount $\theta1$ to a so-called fully-depressed position (at which the depression amount $\theta$ is a maximum depression amount $\theta$max). Further, as understood from FIG. 4, the base reaction force characteristic 100 is set to a characteristic possessing a hysteresis in which the reaction force on the returning side of the accelerator pedal 12 is weaker than that on the depressing side of the accelerator pedal 12.

As shown in FIG. 4, with the reaction force characteristic 101 "Reaction Force: Weak," after the depression amount $\theta$ has reached the threshold depression amount (threshold opening) $\theta$th, and when the accelerator pedal 12 is further depressed, the reaction force F is set so as to follow the trajectory of the target reaction force Ftar specified by the reaction force rising speed variable characteristic Fi.

More specifically, as the target reaction force Ftar, a first target reaction force Fn+Fb (normal reaction force+base reaction force) is set, and with the set reaction force rising speed $\Delta F/\Delta t$ (reaction force increase amount per unit time), the reaction force F is set to increase gradually from the base reaction force Fb at the depression amount $\theta=\theta th$ until reaching the first target reaction force Fn+Fb.

On the other hand, as shown in FIG. 5, with the reaction force characteristic 102 "Reaction Force: Strong," after the depression amount $\theta$ has reached the threshold depression amount $\theta th$, and when the accelerator pedal 12 is further depressed, the reaction force F is set so as to follow the trajectory of the target reaction force Ftar specified by the reaction force increase amount variable characteristic Fj.

More specifically, a second target reaction force Fp+Fb is set, which is larger than the first target reaction force Fn+Fb, together with setting a third target reaction force (according to the present embodiment, although having the same value as the first target reaction force Fn+Fb, since it can also be set to a different value, it is referred to as a third target reaction force) Fn+Fb, which is smaller than the second target reaction force Fp+Fb.

Within the second target reaction force Fp+Fb, an enhanced reaction force Fp (although also referred to as a reaction force increase amount, it can be considered to be a reaction force (reaction force increase bias amount) as a bias amount that is superimposed on the base reaction force Fb) is set to be greater than the normal reaction force Fn (Fp≥Fn).

In addition, from the base reaction force Fb at the depression amount $\theta=\theta th$, the reaction force is set so as to increase by the set reaction force increase amount Fp in a stepwise manner (step shape) to the second target reaction force Fp+Fb, whereupon after elapse of a predetermined time period, the reaction force F is set to decrease to the third target reaction force Fn+Fb with a predetermined decreasing characteristic.

Figure 6A:
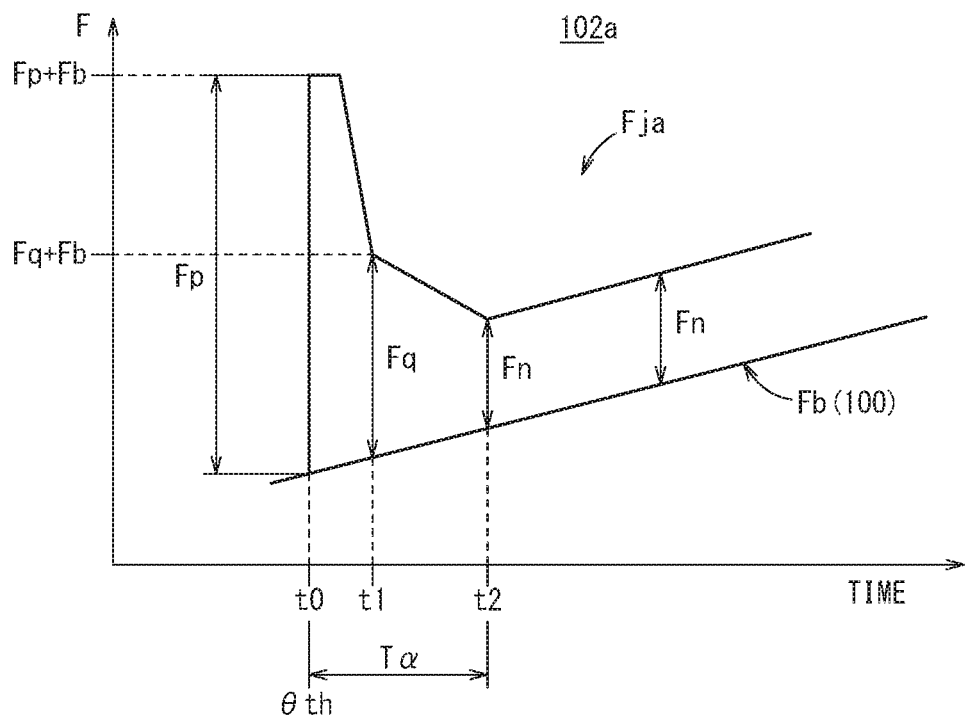
FIG. 6A is a characteristic diagram of an example showing in detail a change of the reaction force imparted with respect to the depression amount corresponding to the process of the flowchart of FIG. 3B.
Figure 6B:
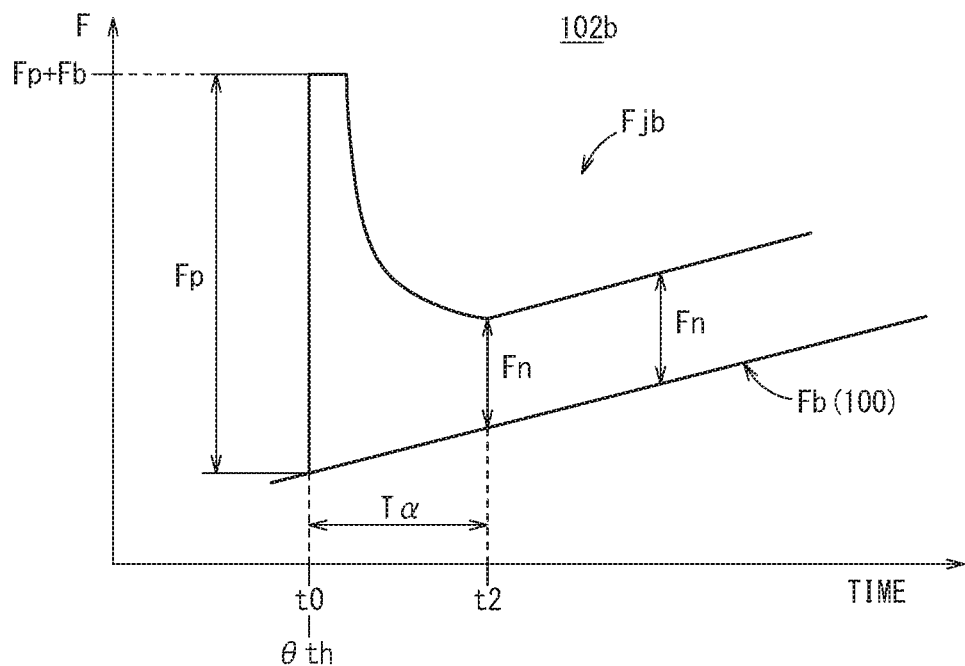
FIG. 6B is a characteristic diagram of another example showing in detail a change of the reaction force imparted with respect to the depression amount corresponding to the process of the flowchart of FIG. 3B.

To explain in greater detail, the reaction force increase amount variable characteristic Fj can be set, for example, to the reaction force increase amount variable characteristic Fja shown in FIG. 6A, or to the reaction force increase amount variable characteristic Fjb shown in FIG. 6B.

With the reaction force increase amount variable characteristic Fja and the reaction force increase amount variable characteristic Fjb shown in FIGS. 6A and 6B, basically, the reaction force is set such that at a point in time t0 at which the depression amount $\theta$ has reached the threshold depression amount $\theta th$, the reaction force increases stepwise by the reaction force increase amount (enhanced reaction force) Fp from the base reaction force Fb to the second target reaction force Fp+Fb, and thereafter, at time t2 after elapse of a predetermined time period Tα, the reaction force decreases to a third target reaction force Fn+Fb that is smaller than the second target reaction force Fp+Fb.

In this case, with the reaction force increase amount variable characteristic Fja shown in FIG. 6A, when the reaction force decreases to the third target reaction force Fn+Fb that is smaller than the second target reaction force Fp+Fb after elapse of the predetermined time period Tα, the reaction force is set so as to decrease rapidly (refer to time t1) to a predetermined reaction force Fq+Fb, which is greater than the third target reaction force Fn+Fb, and then decrease gradually to the third target reaction force Fn+Fb at time t2 following time t1.

On the other hand, with the reaction force increase amount variable characteristic Fjb shown in FIG. 6B, when the reaction force is set to decrease to the third target reaction force Fn+Fb that is smaller than the second target reaction force Fp+Fb after elapse of the predetermined time period Tα, the reaction force is set so as to decrease exponentially with the passage of time to the third target reaction force Fn+Fb.

The above-noted respective values of the target reaction force Ftar (first target reaction force Fn+Fb, second target reaction force Fp+Fb, third target reaction force Fn+Fb), the base reaction force characteristic (base reaction force Fb), the value of the normal reaction force Fn, the value of the reaction force rising speed $\Delta F/\Delta t$ that defines the reaction force rising speed variable characteristic Fi, and the reaction force increase amount (enhanced reaction force) Fp that defines the reaction force increase amount variable characteristic Fj, etc., are capable of being changed responsive to the preferences of the driver using the display device 20 and the operating unit 30 at a time that the vehicle 11 is parked or the like, and such characteristics after being changed are stored in the memory 23, while respective default characteristics are stored in the memory 23 when the vehicle 11 is shipped from the factory. The settings for such values, characteristics, and the threshold depression amount $\theta th$ can be changed in accordance with the intension and operations of the driver, and also responsive to driving conditions such as the vehicle speed, etc., or the driving situation, such as paved roads, unpaved roads, curved roads, entry into high speed expressways, and entry into general roads, or the like.

According to the present embodiment, on the operating unit 30, simulated operating elements such as dials or a volume switch are displayed, together with displaying the respective characteristics and the respective values. Adjustments can be made with the dials or the volume switch, and in this manner, it is possible to modify the respective characteristics and the respective value settings.

Figure 2:
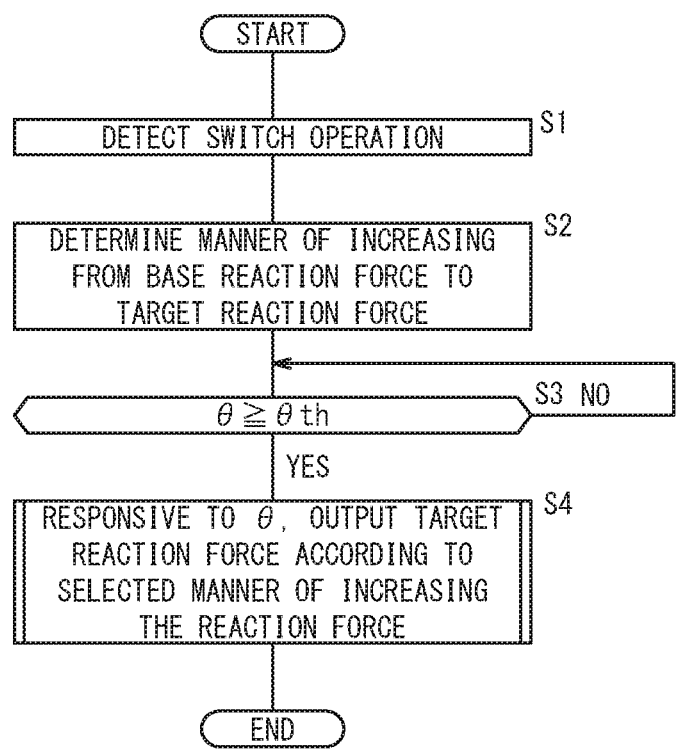
FIG. 2 is a flowchart for describing operations of the accelerator pedal reaction force control device shown in FIG. 1.

Next, returning to the flowchart of FIG. 2, in step S3, in the reaction force control unit 22A, while driving is actually taking place, it is judged continually whether or not the depression amount $\theta$ of the accelerator pedal 12 has exceeded the threshold depression amount $\theta th$.

In the judgment of step S3, in the case that the depression amount $\theta$ has exceeded the threshold depression amount $\theta th$ (step S3: YES), then in step S4, corresponding to the depression amount $\theta$, by outputting the target reaction force Ftar using the manner of increasing the reaction force that was determined (set) in step S2, a reaction force F along the reaction force characteristic 101 (see FIG. 4) or the reaction force characteristic 102 (see FIG. 5) is applied to the accelerator pedal 12 through the reaction force imparting mechanism 24.

In this case, in the case that, in step S1, the reaction force characteristic 101 ("Reaction Force: Weak") is selected (detected) by operating the reaction force characteristic selecting switch 26, then as shown in the flowchart of FIG. 3A, in step S4A, the reaction force is output along the reaction force rising speed variable characteristic Fi (see FIG. 4) of the reaction force rising speed $\Delta F/\Delta t$ that is set responsive to the depression amount $\theta$, until reaching the target reaction force Ftar (Ftar=first target reaction force Fn+Fb), and thereafter, in step S4B, the third target reaction force Fn+Fb continues to be output.

On the other hand, in step S2, in the case that the reaction force characteristic 102 ("Reaction Force: Strong") is selected (detected), then as shown by the flowchart of FIG. 3B, in step S41, the target reaction force Ftar (Ftar=second target reaction force Fp+Fb), which has been increased in a stepwise manner, is output. Thereafter, until an elapsed time period from time to, which is measured by the timing unit 22B, reaches the predetermined time period Tα which is a threshold time period, (step S42: NO), in step S43, the reaction force F gradually decreases along the reaction force increase amount variable characteristic Fja (see FIG. 6A) or the reaction force increase amount variable characteristic Fjb (see FIG. 6B). After the elapsed time period has reached the predetermined time period Tα that serves as the threshold time period (step S42: YES), the third target reaction force Fn+Fb continues to be output.

Summary of Embodiment

As described above, the accelerator pedal reaction force control device 10 according to the present embodiment controls a reaction force F in an opposite direction to a depressing direction of the accelerator pedal 12 provided in a vehicle 11. The accelerator pedal reaction force control device 10 is equipped with the depression amount sensor 14 (depression amount detector) that detects the depression amount θ of the accelerator pedal 12, the reaction force imparting mechanism 24 (reaction force imparting unit) that imparts the reaction force F to the accelerator pedal 12, and the reaction force control unit 22A (reaction force control means) that controls the manner in which the reaction force F is increased by the reaction force imparting mechanism 24.

The reaction force control unit 22A, in the case that the depression amount θ detected by the depression amount sensor 14 becomes greater than or equal to the threshold depression amount θth, sets the target reaction force Ftar imparted by the reaction force imparting mechanism 24, and sets whether the reaction force rising speed ΔF/Δt at which the reaction force increases from the base reaction force Fb at the threshold depression amount θth to the target reaction force Ftar (Ftar=first target reaction force Fn+Fb) should be made variable, or a reaction force increase amount (enhanced reaction force) Fp by which the reaction force increases from the base reaction force Fb at the threshold depression amount θth to the target reaction force Ftar (Ftar=second target reaction force Fp+Fb) should be made variable.

In this case, according to the manner in which the reaction force F is increased (manner of rising) when the reaction force F is imparted to the accelerator pedal 12, the way in which the reaction force F is felt or perceived by the driver differs. Further, the feeling or perception thereof differs depending on the preferences, etc., of the driver.

Focusing on such knowledge, by providing a configuration in which it is possible to set whether the reaction force rising speed ΔF/Δt at which the base reaction force Fb at the threshold depression amount θth increases to a target reaction force Ftar (Ftar=Fn+Fb), should be made variable, or the reaction force increase amount (enhanced reaction force) Fp by which the base reaction force Fb at the threshold depression amount θth increases to the target reaction force Ftar (Ftar=Fp+Fb), should be made variable, an appropriate perception (feeling) of the reaction force can be offered, which is responsive to the intention and operations of the driver. Therefore, for example, the manner of operation (driving style) of the accelerator pedal 12 can be selected, which suits the traffic situation and the mood of the driver or the like.

A configuration is provided in which, in the reaction force control unit 22A, the target reaction force Ftar in the case that the reaction force rising speed ΔF/Δt is set to be variable is defined as the first target reaction force Fn+Fb, the target reaction force Ftar in the case that the reaction force increase amount (enhanced reaction force) Fp is set to be variable is defined as the second target reaction force Fp+Fb, and the second target reaction force Fp+Fb is set to be greater than the first target reaction force Fn+Fb. Thus, in the case that the reaction force rising speed ΔF/Δt is set to be variable, compared to the case of setting the reaction force increase amount (enhanced reaction force) Fp to be variable, it is possible for the reaction force F at the threshold depression amount θth to rise slowly to the first target reaction force Fn+Fb of a small value, and therefore, imparting a sense of discomfort to the driver due to the increase in the reaction force is suppressed.

On the other hand, in the case that the reaction force increase amount (enhanced reaction force) Fp is set to be variable, then since rising of the reaction force F at the threshold depression amount θth up to the second target reaction force Fp+Fb of a large value can be enabled, it can be emphasized that the reaction force F has increased, and the driver can easily be made to notice the increase in the reaction force as a larger wall feeling. In the case that the reaction force increase amount (enhanced reaction force) Fp is set to be variable, for example, by setting the reaction force increase amount (enhanced reaction force) Fp to become larger within a range of a predetermined threshold as the depression speed Δθ/Δt of the accelerator pedal 12 (change in the depression amount θ per unit time) becomes faster, it can be made easy for the driver to notice the enhancement of the reaction force, while in addition, by setting the reaction force increase amount (enhanced reaction force) Fp to become smaller within a range of a predetermined threshold as the depression speed Δθ/Δt of the accelerator pedal 12 becomes slower, the burden on the driver accompanying enhancement of the reaction force can be reduced.

Moreover, in the reaction force control unit 22A, if the depression amount θ detected by the depression amount sensor 14 has become equal to the threshold depression amount θth, the reaction force is set to increase stepwise to the second target reaction force Fp+Fb, and after a predetermined time period Tα following the increase thereof has elapsed, is set to decrease to the third target reaction force (according to the present embodiment, although having the same value as the first target reaction force Fn+Fb, modification of this value is possible) that is smaller than the second target reaction force Fp+Fb. In this case, at a point in time t0 that the accelerator pedal is depressed to the threshold depression amount θth, in accordance with the second target reaction force Fp+Fb, which is applied in a stepwise manner, it is possible to notify the driver of the occurrence of the reaction force F as a strong wall feeling, and thereafter, by gradually decreasing the reaction force F to the third target reaction force Fn+Fb, it is possible to prevent maintenance of a situation in which it is difficult to depress the accelerator pedal 12. By carrying out such a control, it is possible to achieve a balance between ease of depressing operation of the accelerator pedal 12 and ease of noticing that the reaction force has been generated.

In the reaction force control unit 22A, after elapse of the predetermined time period Tα, when the reaction force is set to decrease to the third target reaction force Fn+Fb that is smaller than the second target reaction force Fp+Fb, the reaction force may be set so as to decrease rapidly to a predetermined reaction force Fq+Fb, which is greater than the third target reaction force Fn+Fb, and thereafter, may be set to decrease gradually to the third target reaction force Fn+Fb (FIG. 6A). In accordance with this configuration, by rapidly decreasing the reaction force to the predetermined reaction force Fq+Fb, a large reaction force F is prevented from being maintained for a long time, and a situation in which it is difficult for the accelerator pedal 12 to be depressed by the driver is eliminated. Together therewith, by gradually decreasing the reaction force F (time t1 to time t2) after having been decreased to the predetermined reaction force Fq+Fb, a sense of discomfort due to so-called sudden falling off of the reaction force can be reduced.

Further, in the reaction force control unit 22A, after elapse of the predetermined time period Tα, when the reaction force is set to decrease to the third target reaction force Fn+Fb that is smaller than the second target reaction force Fp+Fb, the reaction force is set so as to decrease exponentially with the passage of time (time t0 to time t2 of FIG. 6B) (see FIG. 6B). In this case, the reaction force decreases rapidly upon starting to decrease, and thereafter decreases more gradually. Therefore, it is possible to both quickly eliminate a condition in which depression of the accelerator pedal is difficult, and reduce a sense of discomfort due to sudden falling off of the reaction force.

Furthermore, a configuration may be provided in which the reaction force characteristic selecting switch 26 is included as a selecting unit, which selects whether the reaction force rising speed ΔF/Δt should be made variable, or the reaction force increase amount (enhanced reaction force) Fp should be made variable, and the reaction force control unit 22A may carry out either one of the settings responsive to a selection result of the reaction force characteristic selecting switch 26. Due to this configuration, by the driver or the like operating the reaction force characteristic selecting switch 26, since it is possible to select whether the reaction force rising speed ΔF/Δt or the reaction force increase amount Fp should be made variable, the perception (feeling) of the reaction force F of the accelerator pedal 12 can be selected in accordance with the driver's intention.

As noted above, according to the present embodiment, a configuration is provided in which it is possible to set whether a reaction force rising speed ΔF/Δt, at which the reaction force increases from the base reaction force Fb at the threshold depression amount θth to the target reaction force Ftar, should be made variable, or a reaction force increase amount (enhanced reaction force) Fp, by which the reaction force is made to increase from the base reaction force Fb at the threshold depression amount θth to the target reaction force Ftar, should be made variable, when the depression amount θ of the accelerator pedal 12 becomes greater than or equal to the threshold depression amount θth. Therefore, an effect is achieved in that an appropriate perception (feeling) of the reaction force F can be given, which is responsive to the intention and operations, etc. of the driver.

Therefore, for example, a secondary effect is achieved, in which the manner of operation (driving style) of the accelerator pedal 12 can be selected depending on the traffic situation and the mood of the driver or the like.

According to the present embodiment as described above, the reaction force F (load) is imparted to the accelerator pedal 12 at the set threshold depression amount θth. Using the reaction force F (load), the depressing operation of the leg is easily stopped, while at the same time, without worsening the operability of the accelerator pedal 12 during depression thereof after having overcome the reaction force F, a load sensation can be imparted that matches with the respective switch positions "Reaction Force: Weak" and "Reaction Force: Strong" of the reaction force characteristic selecting switch 26.

The present invention is not limited to the aforementioned embodiment, but various alternative arrangements may be employed based on the disclosed content of the present specification.

The invention claimed is:

1. An accelerator pedal reaction force control device that controls a reaction force in an opposite direction to a depressing direction of an accelerator pedal provided in a vehicle, comprising:
a depression amount detector configured to detect a depression amount of the accelerator pedal;
a reaction force imparting unit configured to impart the reaction force to the accelerator pedal; and
a reaction force control unit configured to control a manner in which the reaction force is increased by the reaction force imparting unit;
wherein the reaction force control unit, in a case that the depression amount detected by the depression amount detector becomes greater than or equal to a threshold value, sets a target reaction force imparted by the reaction force imparting unit, and sets whether a reaction force rising speed at which the reaction force increases from a base reaction force at the threshold value to the target reaction force should be made variable, or a reaction force increase amount by which the reaction force increases from the base reaction force at the threshold value to the target reaction force should be made variable; and
wherein in the reaction force control unit:
the target reaction force in a case that the reaction force rising speed is set to be variable is defined as a first target reaction force;
the target reaction force in a case that the reaction force increase amount is set to be variable is defined as a second target reaction force; and
the second target reaction force is set to be greater than the first target reaction force.

2. The accelerator pedal reaction force control device according to claim 1, wherein in the reaction force control unit, if the depression amount detected by the depression amount detector has become equal to the threshold value, the reaction force is set to increase stepwise to the second target reaction force, and after a predetermined time period following the increase thereof has elapsed, is set to decrease to a third target reaction force that is smaller than the second target reaction force.

3. The accelerator pedal reaction force control device according to claim 2, wherein in the reaction force control unit, after elapse of the predetermined time period, when the reaction force is set to decrease to the third target reaction force that is smaller than the second target reaction force, the reaction force is set so as to decrease rapidly to a predetermined reaction force, which is greater than the third target reaction force, and thereafter, is set to decrease gradually to the third target reaction force.

4. The accelerator pedal reaction force control device according to claim 2, wherein in the reaction force control unit, after elapse of the predetermined time period, when the reaction force is set to decrease to the third target reaction force that is smaller than the second target reaction force, the reaction force is set so as to decrease exponentially with passage of time.

5. The accelerator pedal reaction force control device according to claim 1, further comprising a selecting unit configured to select whether the reaction force rising speed should be made variable, or the reaction force increase amount should be made variable; and
wherein the reaction force control unit carries out either one of the settings responsive to a selection result of the selecting unit.

* * * * *